Figure 1:
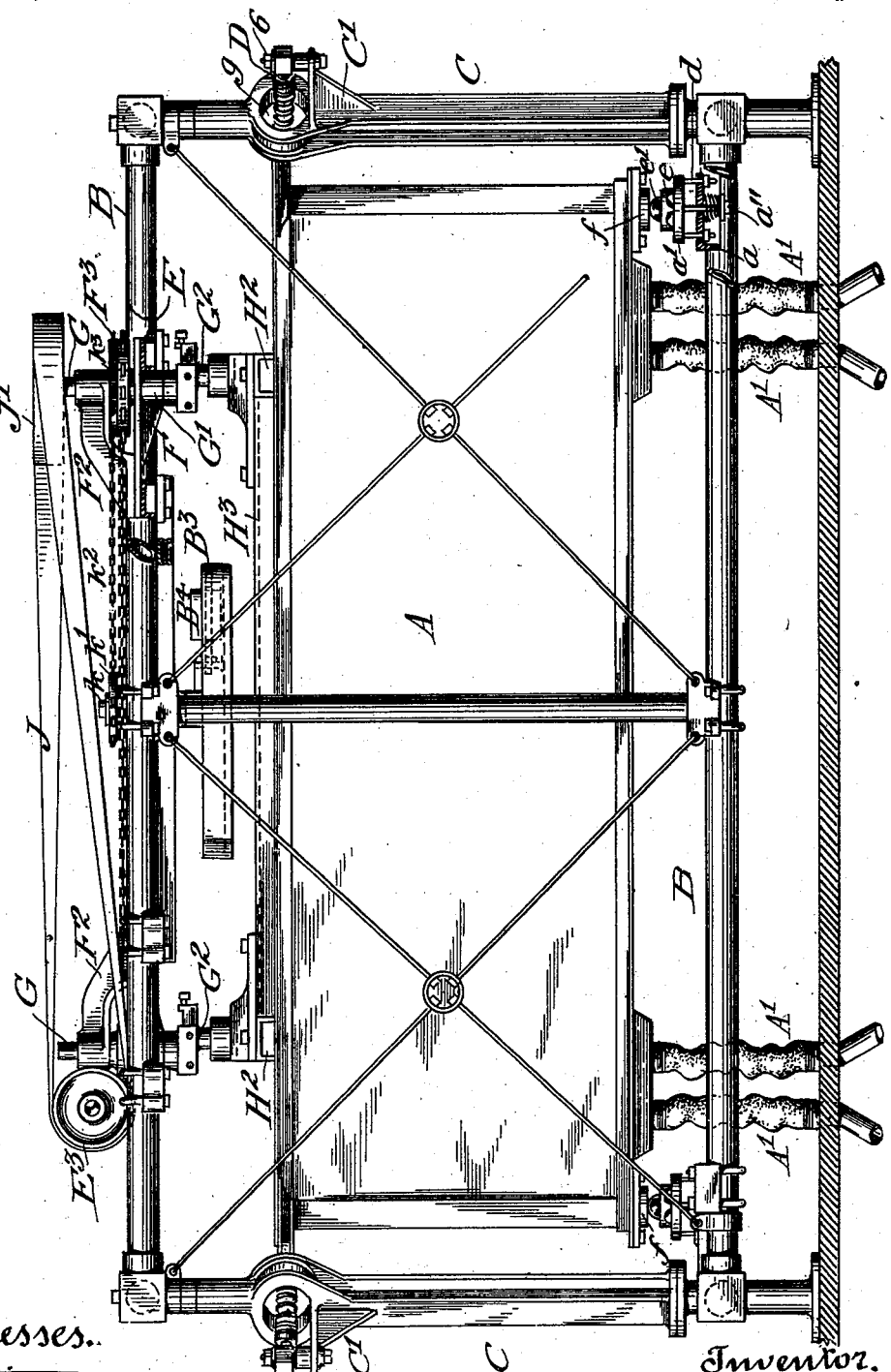

No. 711,650. Patented Oct. 21, 1902.
F. W. WOOD.
ORE GRADING APPARATUS.
(Application filed July 24, 1901.)
(No Model.) 4 Sheets—Sheet 1.

Witnesses.
Inventor.
Frederick W. Wood
by Spear Seely
Attorneys.

No. 711,650. Patented Oct. 21, 1902.
F. W. WOOD.
ORE GRADING APPARATUS.
(Application filed July 24, 1901.)
(No Model.) 4 Sheets—Sheet 2.

Witnesses. Inventor.
Frederick W. Wood
by Spear Seely
Attorneys.

No. 711,650. Patented Oct. 21, 1902.
F. W. WOOD.
ORE GRADING APPARATUS.
(Application filed July 24, 1901.)
(No Model.) 4 Sheets—Sheet 3.
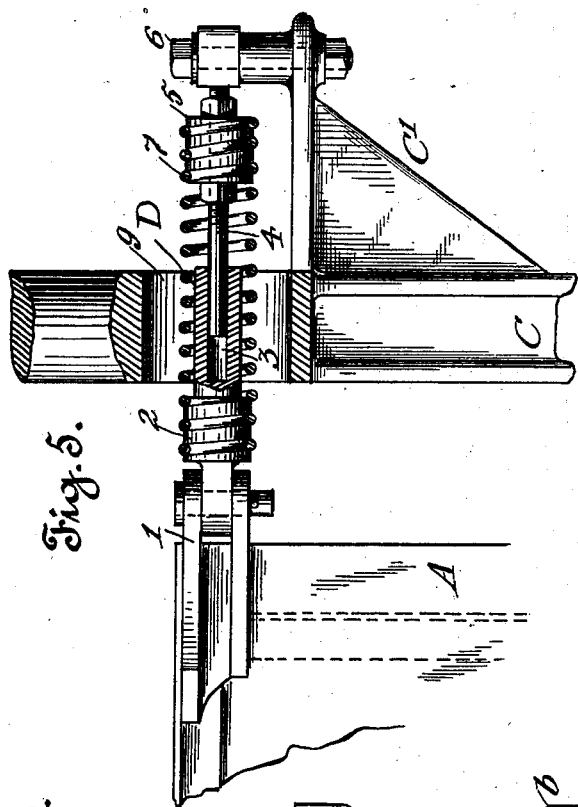
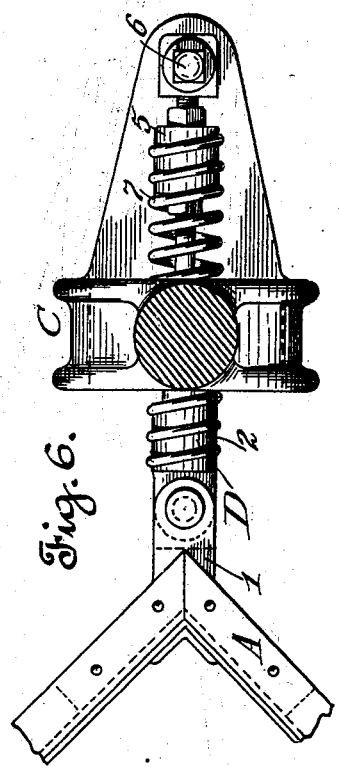
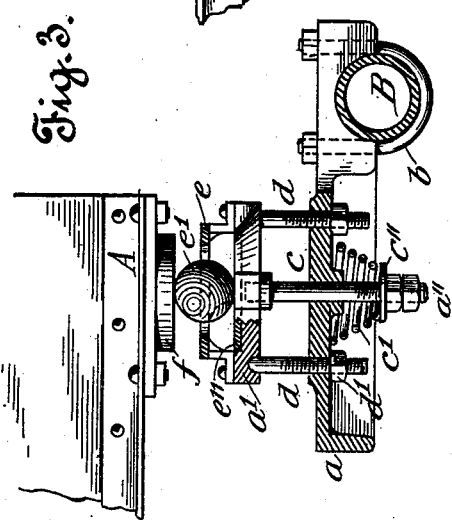
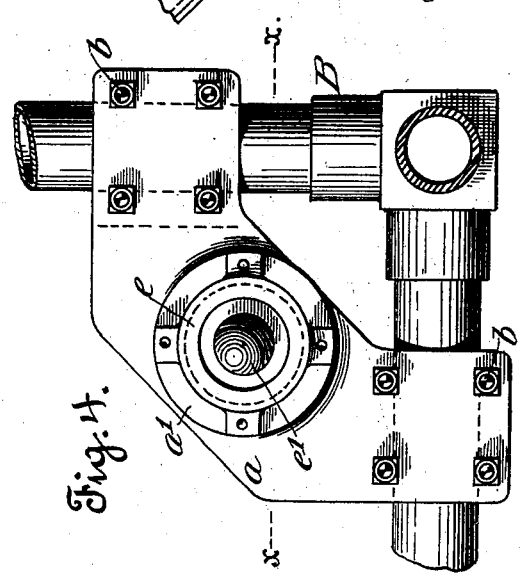
Witnesses.
Inventor.
Frederick W. Wood
by Spear Seely
Attorneys

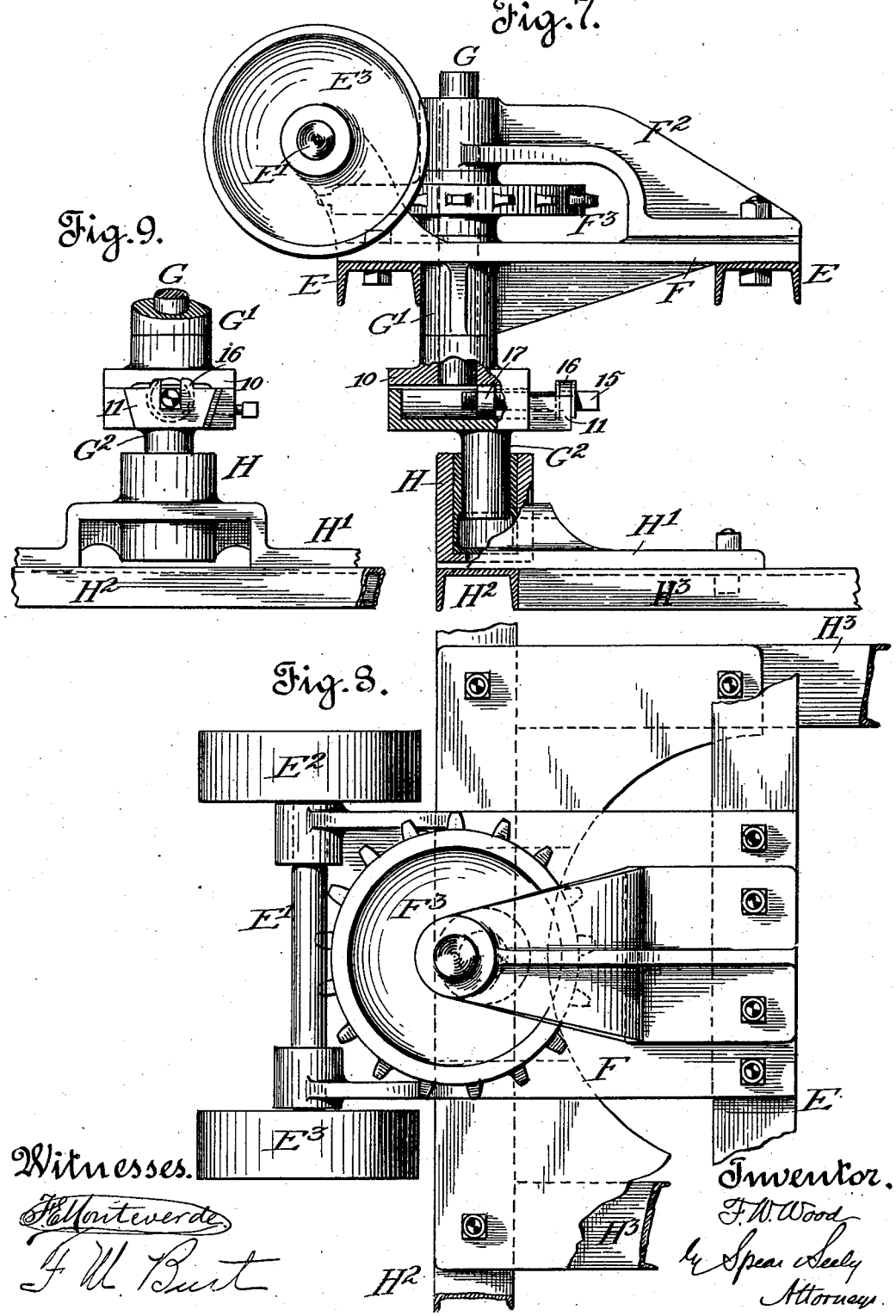

UNITED STATES PATENT OFFICE.

FREDERICK W. WOOD, OF SAN FRANCISCO, CALIFORNIA, ASSIGNOR TO CROWN GOLD MILLING COMPANY, OF SAN FRANCISCO, CALIFORNIA.

ORE-GRADING APPARATUS.

SPECIFICATION forming part of Letters Patent No. 711,650, dated October 21, 1902.

Application filed July 24, 1901. Serial No. 69,477. (No model.)

*To all whom it may concern:*

Be it known that I, FREDERICK W. WOOD, a citizen of the United States, residing at San Francisco, in the county of San Francisco and State of California, have invented certain new and useful Improvements in Ore-Grading Apparatus, of which the following is a specification.

My invention relates to apparatus for sizing and grading fine material, and more particularly to the sizing and grading of pulverized ore preparatory to its concentration for the extraction of precious materials.

The art of concentration by modern methods and apparatus has attained a high degree of perfection, and this is particularly true of the art of dry concentration by means of carefully-regulated air-currents acting through pervious separating-surfaces or traveling belts. The relations of air-currents of regulated strength to the weight and fineness of the pulverized material acted upon have been carefully calculated, and hence it has been found desirable to separate the material into a great number of grades, so that a current of any given strength may act upon material which is as nearly uniform as possible.

The object of this invention is to provide an efficient grader of great capacity for producing these sizes, the special effectiveness arising from the peculiar motion imparted to it by a novel connected mechanism. The arrangement of screens within the separator forms no part of my invention, which relates principally to novel means for imparting motion to it and for regulating, controlling, and limiting such motion.

In a machine constructed as shown in the drawings I have graded to a fineness of one hundred and eighty mesh and in practice employ such machines for producing grades of from about thirty mesh of screen to the said one hundred and eighty mesh. So far as I am aware ore has never been graded to this fineness; but the peculiar motion devised by me and herein described enables me to successfully accomplish that result.

My invention is illustrated in the accompanying drawings, in which—

Figure 2:
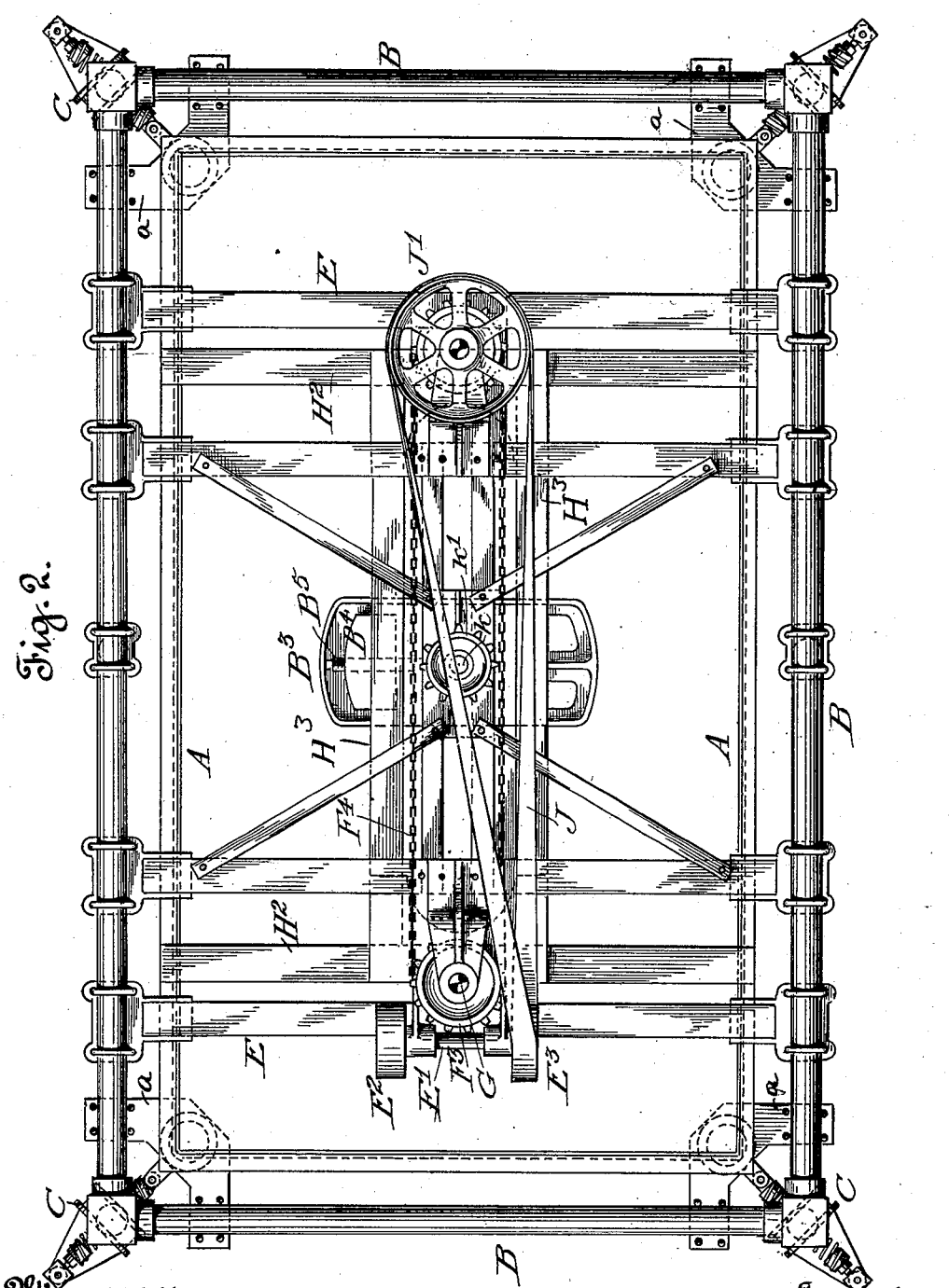

Figure 1 is a side elevation of the separator. Fig. 2 is a top plan of the same. Fig. 3 is an enlarged sectional elevation of one of the ball-supports of separator-box. Fig. 4 is a top plan of same. Fig. 5 is an enlarged detail view of one of the corner spring-supports of separator-box. Fig. 6 is a top plan of the same. Fig. 7 is an enlarged detail view of one of the driving and shaking mechanisms. Fig. 8 is a top plan of same. Fig. 9 is a front view, partly broken off, Fig. 7.

The separator consists of a rectangular-shaped box A, closed on all sides but the top, where the material is fed, and having at the bottom flexible hose-like outlets A' for the different grades of ore, connecting with stationary bins or other receptacles for the finished product. The box is adapted to contain inside a set of screens of the different meshes required, each separately connected with its corresponding flexible outlet-spout, thus separating the ground ores fed at the top of the box into any number of grades of fineness desired, to be subsequently treated each by itself. Surrounding this separator-box A is a framework B, mounted upon four columns C, the columns being set a short distance away from and at the four corners of the separator-box A, the whole being in the present case made of metal tubing with cast columns and iron tie-rods, constituting a light, strong, and, most important of all, a rigid supporting-framework to resist the violent oscillatory eccentric movement that is imparted to the separating-box A, as hereinafter described. Upon the lower part of the framework and attached thereto at each of its four corners is a bracket $a$, embracing each of the framing-tubes of the frame B (see Figs. 1, 3, 4) and fastened rigidly to them by strap-bolts $b$. Upon this bracket is mounted a supporting circular horizontal bearing-plate $a'$, having a central bolt $a^{11}$ screwed or otherwise fastened to it, the said bolt passing loosely through a hole $c$ in the bracket $a$ and projecting below the same sufficiently to be fitted with a spring $c'$ and washer $c^{11}$. Between the lower face of the bracket $a$ and the nut under the said bearing-plate $a'$ are studs $d$, which are screwed firmly to the bracket $a$, but only rest against suitable cup-like depressions in the under surface of the bearing-plate $a'$, as shown in Fig. 3. These bolts $d$ are susceptible of vertical adjustment by screwing more or less through the supporting stationary bracket $a$ and once adjusted can be set firmly by means of the nuts $d'$. Upon the bearing-plate $a'$ is firmly secured a circular frame or ring $e$, having lugs depending therefrom with lips to fasten to the plate $a'$, as shown in Figs. 3 and 4. This ring is raised sufficiently from the face of the plate $a'$ to allow free movement within its inner radius to a hardened-steel sphere or ball $e'$ and prevent its rolling away. The face of the plate $a'$, upon which the ball rests, may to better resist wear be lined with a hardened-steel plate. (Shown in Fig. 3 at $e^{11}$.) As before stated, these supported ball-bearings are located at each of the four corners of the frame B and at a suitable distance within said frame, so as to allow the supporting thereupon and the movement of the separating-box A. The box has fastened upon each of its four corners on its bottom flat bearing-plates $f$, corresponding with those upon which the bearing-balls $e'$ rest, and it is upon these that the separator-box rests when set up, as seen in Figs. 1 and 2. To the four outer and upper corners of the separator-box are pivoted four sustaining-spring slip-joints D, (see Figs. 5, 6,) which pass through suitable openings $g$ in the columns C and have their outwardly-extending ends pivoted to brackets C', forming part of the column C. This sustaining-spring slip-joint comprises the following parts: a hinge-bracket 1, attached to and forming part of the separator at each of its corners and upon which is fulcrumed the female rod and head 2, which in turn receives within its inner bore 3 the slip-rod 4, this latter passing through and forming part of the spring-holding head 5. This head 5 is fulcrumed by pin 6 to the bracket C', as before stated. The spring 7, as will be seen, surrounds the rods 2 and 4. One of its extremities is fast around the head 5 and the other is secured to the head of rod 2, leaving an intervening length between free to act by compression or retraction notwithstanding that the rods 2 and 4 are respectively fulcrumed to the movable separator-box A and the rigid columns C. This is made possible by the peculiar construction of this slip connection. It will be seen by examination of Fig. 5 that when the separator by its movement extends the spring the latter giving by its resilience allows the female rod 2 to slip away along the rod 4 within its bore 3, and the reverse being the case when in a backward movement it causes the spring to retract. Besides, from its being fulcrumed at its outer and inner extremities it allows of a further circular or oscillating horizontal movement in every direction.

To the upper tubes of the frame B are attached cross-beams E in pairs. These support the driving mechanism of the separator-box, which mechanism is a double one and set immediately over the top of the box near its ends. These double driving mechanism are alike, and a description of one will be sufficient. A cast-iron bracket F is fastened to one pair of the cross-frame beams E aforesaid, one of which brackets supports the cross-shaft E', carrying the main driven pulley $E^2$ and the driver $E^3$. Upon this bracket F is mounted another, $F^2$, forming bearings for the sprocket-wheel $F^3$. The sprockets $F^3$ are connected across the top of the framework by a sprocket-chain $F^4$. The vertical shaft G, carrying the sprocket-wheel $F^3$ and which shaft extends below its bearing in the bracket F, carries upon its lower end an adjustable eccentric-pin $G^2$, which in turn engages within the vertical bearing H, forming part of a bracket H'. The part H' is mounted upon a frame fastened to and making part of the separator-box A and consisting of the cross-beams $H^2$ and the tie-beams $H^3$. (See Figs. 1 and 2.) The adjustable eccentric-pin is constructed as follows: Upon the vertical shaft G is secured the headpiece 10, within which slides the beveled piece 11, which is part of the pin proper, $G^2$. Differential eccentricity between the centers of pins $G^2$ and G is obtained by means of the adjustable slide-rest. (Shown in Fig. 7.) The screw 15, engaged upon the flange 16 of the pin-head 11, is enabled to turn without lateral movement, and as its threaded end engages with the inner threaded lip 17, attached to the fixed head 10 of shaft G, it will be seen that as it is screwed to right or left it will correspondingly move inwardly or outwardly, the sliding beveled head 11 carrying the pin $G^2$, thus reducing or increasing its distance from the line of the vertical driving-shaft G, and thereby proportionately changing the movements of the separator-box, to which it is connected. As before said, the separator in order to obtain stronger and firmer movement is driven by two sets of eccentric-pins, the first one driving the second through a quarter-twist belt J from pulley $E^3$ upon the main driven shaft E' to the horizontal pulley J' upon the second driving mechanism, this driving back to the first mechanism through the chain $F^4$ and sprockets $F^3$.

The object of the adjustable ball-bearings before mentioned is to allow the separator free movement and frictionless support upon four points of contact only.

The object of the four spring slip-joints at the upper corners is for the same purpose, besides being to keep the separator from taking on any unnecessary strange movements through its impacts, being held in check to its proper movements by the resilient resistance of the springs and fulcrumed points, as before described.

The movement of the separator is an eccentric gyrating swing given to the whole box on a perfectly and steadily maintained horizontal plane, having no upward jar to disturb its movements.

Under some circumstances it may be desirable to somewhat counteract the force with which the box is thrown outwardly toward the spring corner-supports. In these cases I may use the counterbalance $B^3$. This is an oblong frame or plate mounted on a vertical shaft $k$, at the upper end of which is a sprocket $k'$, driven at the same rate of speed as the other mechanism by a chain $k^2$ to sprocket-teeth $k^3$. In the frame $B^3$ is a sliding weight $B^4$, adjustable toward or from the supporting-shaft by a screw $B^5$. The position of the frame relatively to the casing is such that the centrifugal action of its weight opposes the throw of the box toward any corner, and the effect is varied and regulated by adjustment of the weight on the radius represented by the screw $B^5$.

I do not limit myself to the exact construction herein described, and shown in the drawings, as I desire to avail myself of such modifications and equivalents as fall properly within the spirit of my invention.

Having thus fully described my invention, what I claim as new, and desire to secure by Letters Patent, is—

1. A grader comprising a frame, a box or casing, having plane bearing-surfaces at the corners, balls at the corners upon which said bearing-faces rest, plane or flat bearing-surfaces carried by the frame upon which said balls rest, and means adjustably connected with said box for imparting a gyrating movement thereto, said movement being varied by the adjustment of said connections, substantially as described.

2. A grader comprising a frame, a box or casing having a plurality of flat or plane bearing-faces, balls on which said bearing-faces rest, brackets secured to the frame, flat bearing-plates supported by said brackets and in turn supporting said balls, retaining rings or flanges carried by said plates and encircling the balls for allowing them a limited movement, means for imparting a gyratory movement to said box, and means whereby the extent of said movement may be varied, substantially as described.

3. In combination, the frame, the brackets secured thereto at the corners, a plurality of supporting-pins adjustably seated in each bracket, a bearing-plate seated on the upper end of each set of pins, a tie-bolt yieldingly connecting the plate and bracket, a ball seated on each bearing-plate, a box having bearing portions seated on said balls and means for imparting a gyratory movement to said box, substantially as described.

4. In combination the frame, the box supported therein to move in a horizontal plane, means for imparting a gyratory movement thereto, and yielding spring resistances at the corners comprising each a pair of telescoping members pivotally connected respectively to the box and frame, and springs encircling said telescoping members, substantially as described.

In testimony whereof I have affixed my signature, in presence of two witnesses, this 18th day of April, 1901.

FREDERICK W. WOOD.

Witnesses:
 I. N. HOCKETT,
 LORING B. DOE.